United States Patent [19]

Maupu

[11] Patent Number: 4,920,893

[45] Date of Patent: May 1, 1990

[54] AXLE WITH MAGNETIC GUIDANCE FOR RAILROAD VEHICLES

[75] Inventor: Jean-Louis Maupu, Villejuif, France

[73] Assignees: Matra Transport; Institut National de Recherche sur les Transports et leur Securite, both of France

[21] Appl. No.: 205,212

[22] Filed: Jun. 10, 1988

[30] Foreign Application Priority Data

Oct. 14, 1986 [FR] France ................................ 86 14255

[51] Int. Cl.$^5$ .............................................. B61F 5/38
[52] U.S. Cl. ...................................... 104/242; 104/293
[58] Field of Search ................. 105/77, 78, 167, 168, 105/182.1, 185; 104/242, 293, 290, 291, 292, 304; 180/168

[56] References Cited

U.S. PATENT DOCUMENTS

| | | | |
|---|---|---|---|
| 2,046,310 | 6/1934 | Billner | 105/77 X |
| 3,577,928 | 5/1971 | Victorri | 104/292 |
| 3,589,302 | 6/1971 | Usami | 104/291 |
| 3,618,529 | 11/1971 | Bertin | 104/290 X |
| 3,807,313 | 4/1974 | Koyanagi | 104/291 |
| 3,941,062 | 3/1976 | Machefert-Tassin | 105/77 X |
| 4,038,928 | 8/1977 | Degen | 105/77 X |
| 4,088,939 | 5/1978 | Mitschke et al. | 180/168 X |
| 4,440,092 | 4/1984 | Sobolewski | 104/304 X |
| 4,593,625 | 6/1986 | Shimizu et al. | 105/77 X |

FOREIGN PATENT DOCUMENTS 2544260 4/1977 Fed. Rep. of Germany ...... 180/168

Primary Examiner—Margaret A. Focarino
Assistant Examiner—Dean J. Kramer
Attorney, Agent, or Firm—Larson and Taylor

[57] ABSTRACT

An orientable axle with independent wheels comprises a beam perpendicular to the axis of the wheels. It also comprises sensors (16, 20) for measuring the position of the beam with respect to the track; a reference position with respect to the track is predetermined. Electromagnets (22) carried by the axle cooperate with the track for exerting on the axle a force for orientating it. A control circuit delivers a current to the electromagnets for moving the axle in an angular direction which tends to cancel out the difference between the measured position and the reference position. The axle can be used on railroad vehicles having to negociate curves at high speeds.

6 Claims, 3 Drawing Sheets

AXLE WITH MAGNETIC GUIDANCE FOR RAILROAD VEHICLES

BACKGROUND OF THE INVENTION

The invention relates to railroad vehicles having axles with metal support wheels and it finds a particularly suitable for use in the construction of high speed transport installations whose track includes urban sections likely to comprise small radius curves.

Conventional railroad axles are self guided because the two wheels are interlocked for rotation and have tapered treads so that any offcentering of the axle causes the radii of the rolling circles on both sides of the axle to vary in opposite directions. The axle then tends to move in a direction which recenters it with respect to the track. To avoid any instability, two axles in a bogey are connected by means of resilient return means in the axle boxes, optimization being obtained by an appropriate choice of the stiffness of the return means, of the wheel base, of the taper of the tread and of the unsuspended weights.

But the search for high speed stability leads to choosing, for the stiffness of the resilient return means, the wheel base of the bogey and the taper of the treads, values which reduce the possibility of passing without slipping over highly curved track sections in practice, for the values chosen at present, it is not possible to negociate a radius of about 700 m without the risk of the wheels coming into contact by their flanges. At the present time, in order to be able to negociate the inevitable curves in an urban environment, it is necessary to grease the rails for high speed equipment.

Different approaches have been proposed to make high speed stability and the negociation of tight curves compatible. One approach, used with the Spanish "TALGO" trains, consists in using an axle with independent wheels oriented by a shaft hitched to the preceding carriage of the train. The device makes the trains irreversible, does not operate on the leading carriage and does not provide accurate guiding on going into and leaving curves. These are troublesome limitations.

SUMMARY OF THE INVENTION

The invention aims at providing an axle for a railroad vehicle answering better than those known heretofore the requirements of practice, particularly in that it provides high speed stability and makes it possible to tolerate small radius curves.

To this end, the invention provides an orientable axle with independent metal wheels for railroad vehicles comprising a beam perpendicular to the axis of the wheels, characterized in that it also comprises sensor means for measuring the position of the beam with respect to the track, means for determining a reference position with respect to the track, electromagnetic means carried by the axle cooperating with the track for exerting on the axle a force for orientating it, and a control circuit delivering a current to the electromagnetic means so that these means tend to cancel out the different between the measured position and the reference position.

In an advantageous embodiment of the invention, the axle includes a sensor for measuring the deviation along the axis of the wheel and a sensor for measuring the deviation at at least one end of the shaft. Provided that memory means are used, it is possible to derive the position at both ends of the beam from the elements delivered by two sensors only. In one approach, the axle is capable of operating in the same way whatever the direction of movement over the track, by providing a sensor at each end of the beam.

The sensors may more particularly be provided for measuring the air-gap with respect to a ferromagnetic element belonging to the track.

If we designate then by $e_{ar}$, $e_m$ $e_{av}$, the air-gaps at the rear, at the middle and at the front of the shaft with respect to a centering position, on a rectilinear track these three air-gaps will be given a reference value $E_o$ and, on a curved track, they will be given values:

$$e_m = e_o$$

$$e_{av} - e_{ar}$$

Through using electromagnetic means controlling the orientation of the beam, these means have only to provide a torque or moment of rotation and may consequently have only a reduced power. Advantageously, the means include two members placed symmetrically with respect to the axis of rotation of the wheels, fed with power so as to exert forces in mutually opposite directions. The electromagnetic means thus create a deflection angle which results, when the axle is rotating, in a return force which can be calculated by Kalker's formulae. The electromagnetic members placed at the end of the beam are advantageously completed by an additional electromagnetic member placed at the level of the axis of the axle, capable of exerting an appreciable transverse force, associated with a circuit which brings it into play only in the case of a transitory inability, of short duration, of the axles to come back to the correct path under the action of a deflection angle, for example in the case of a loss of adhesion.

To reduce the consequences of a malfunction or a breakdown of the control circuits, mechanical stops will be provided for example close to the ends of the beam.

A symmetrical construction with respect to the axis of the wheels and an equally symmetrical control of the electromagnetic means has the advantage of making the system completely reversible. But a disymmetric assembly may however be used, by providing reversal means depending on the travelling direction.

The unit comprising the active part of a linear traction motor, the electromagnetic means and the sensors may be integrated in a beam provided for travelling in a rail of U shaped cross section forming the armature for the linear motor and a guide element. This rail, belonging to the track, may be situated at a level higher than that of the running track formed by the support rails. The beam is connected to the axle by suspension means. The suspended weights can be decoupled if a small transverse stiffness of the suspension between the body and the axle is provided. The suspension between the axle and the beam must be stiff in the transverse and longitudinal directions so that the connection between the beam and the axle is practically rigid in rotation.

BRIEF DESCRIPTION OF THE DRAWINGS

The invention will be better understood from the following description of particular embodiments given by way of non limitative examples. The description refers to the accompanying drawings in which.

DETAILED DESCRIPTION OF PREFERRED EMBODIMENT

Figure 1:
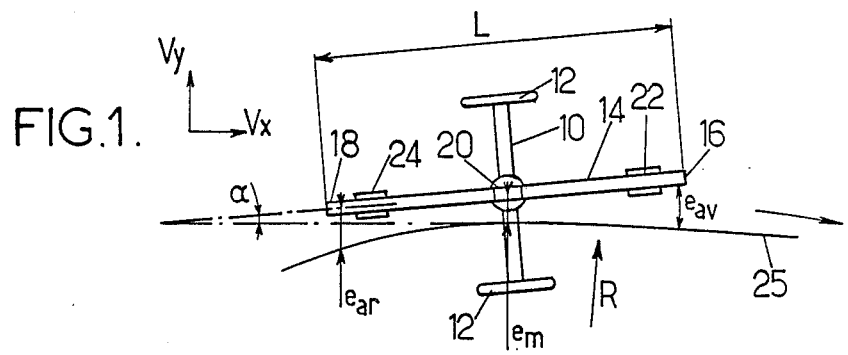
FIG. 1 is a diagram, in which the deviations have been shown with a very exaggerated amplitude, showing the parameters which come into play in the guiding of an axle.

FIG. 1 shows an axle with an axle shaft 10 about which rotate two independent wheels 12 travelling over rails (not shown). Shaft 10 is fast with a beam 14 whose position with respect to the track is measureable by:

two end sensors 16 and 18 placed respectively at the front and at the rear of beam 14, and a median sensor 20 placed in line with the shaft 10 of the axle.

If we designate by:

L The distance between sensors 16 and 18 (which will be supposed symmetrical with respect to the axis of the wheels)

R the radius of curvature of the track (greater than L by several orders of size)

$\alpha$ the deflection angle f the camber of the track over length L

F the return force exerted on the axle.

$e_{av}$, $e_{ar}$ and $e_m$ the air gaps measured respectively by sensors 16, 18 and 20, the camber f and the deflection angle $\alpha$ can be directly calculated from the airgap values delivered by the sensors. The value of R may in its turn be derived from the air-gaps by the formula:

$$1/R = 8f/L^2$$
$$= (4 e_{av} + 4 e_{ar} - 8 e_m)/L^2$$

The transverse return force F may be determined from the deflection angle $\alpha$ and from the reduced deflection speed (ratio between the transverse speed Vy and the longtiudinal speed Vx):

$$F = K(\alpha - Vy/Vx)$$

In this formula K designates a constant and Vy corresponds to the speed of variation of the air-gap $e_m$, which may be designated by $\ddot{e}_m$.

If the axle is subjected to a disturbing force P, such as the centrifugal force, the dynamic equation of the axle is:

$$e_m M = K(\alpha - e_m/Vx) + P$$

This formula, in which M designates the weight associated with the axle, shows that $\ddot{e}_m$ may be cancelled out at any time by acting on the control parameter $\alpha$.

To act on $\alpha$, that is to say to angularly move the axle with respect to the track, the beam is provided with electromagnetic means formed, in the embodiment shown in FIG. 1, by two members 22 and 24 each placed at one end of the beam, close to the corresponding sensor. Through their symmetrical assembly, members 22 and 24 have only to exert a torque or moment of rotation on the beam. Each of the members may be formed by a pair of electro-magnets cooperating with a rail forming the median line 25 of the track.

Calculation shows that the reference angle $\alpha_c$ is given by the formula:

$$\alpha_c = A_1(e_o - e_m) - A_2 e_m - A_3(V_x + V_o)e_m$$

in which $A_1$, $A_2$, and $A_3$ are constants.

Figure 2:
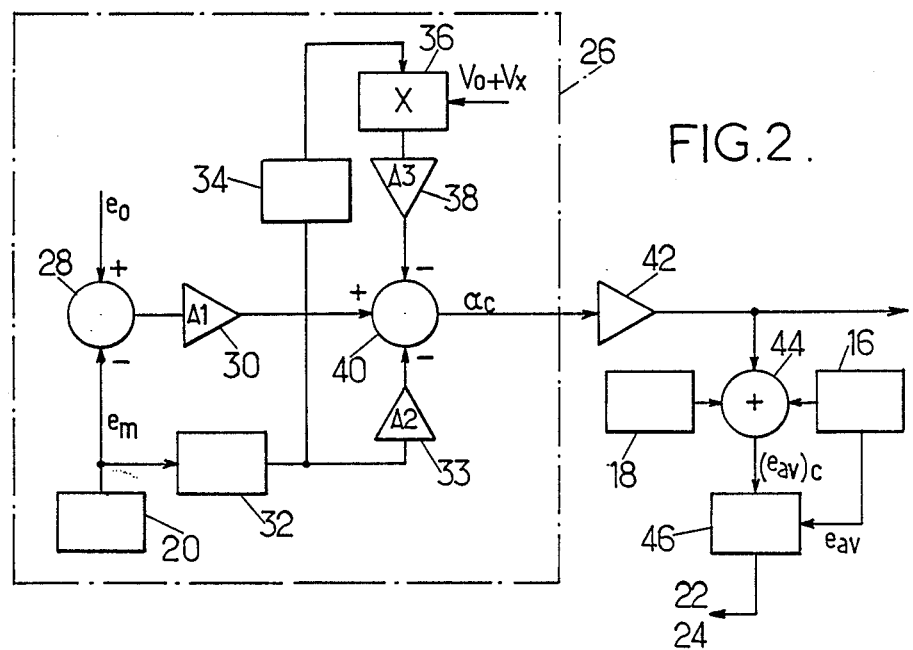
FIG. 2 is a general diagram showing a possible construction of a regulation circuit.

The value of $\alpha_c$ may consequently, except for a multiplicative constant, be obtained by the circuit 26 of FIG. 2. This circuit includes a subtractor 28 which receives both the reference value of the air-gap $e_o$ and the value $e_m$ delivered by sensor 20. An amplifier 30 with gain $A_1$ generates, from the output of the subtractor, the first term of the above equation (1) which represents the return force tending to bring the axle back into a centered position. Two derivating circuits 32 and 34 connected in cascade make it possible to obtain the deflection speed and acceleration. From $e_m$, an amplifier 33 with gain $A_2$ delivers the second term of the equation (1), which represents the main damping. Finally, a multiplier 36, (which receives a speed signal delivered by a sensor placed on the vehicle,) and amplifier 38 with gain $A_3$ deliver the third term of the equation (1) which represents second order damping.

The outputs of amplifiers 30, 33 and 38 are applied to a subtractor 40 which delivers a signal proportional to $\alpha_c$.

From $\alpha_c$ and the actual values of the air-gaps $e_{av}$ and $e_{ar}$ it is possible to work out the reference magnitudes of the reference air-gaps $(e_{av})_c$ and $(e_{ar})_c$ using the formulae:

$$(e_{av})_c = \tfrac{1}{2}(e_{av} + e_{ar} + \alpha_c L)$$

and $$(e_{ar})_c = \tfrac{1}{2}(e_{av} + e_{ar} - \alpha_c L) \tag{2}$$

FIG. 2 shows by way of example, a circuit for working out $(e_{av})_c$ including an amplifier 42, with gain proportional to L and an adder 44.

From the values of $(e_{ar})_c$, $e_{av}$ and $e_{ar}$, a regulation circuit 46 of known construction provides the current for supplying member 22. A second branch similar to the first one, feeds member 24.

An additional circuit may be provided for supplying a central electromagnetic return member with power when the deviation $e_m$ exceeds a given threshold, so as to exert a transverse return force tending to bring the axle back to a centered position.

Figure 3A:
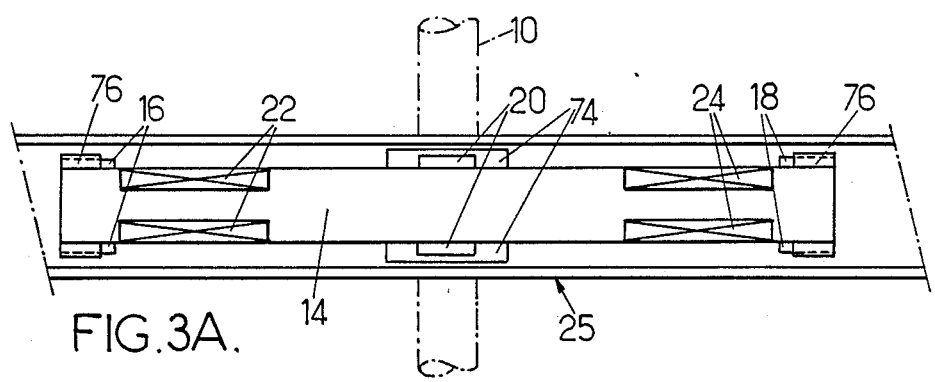
FIGS. 3 and 3a are diagrams, respectively in perspective and in a top view, showing the possible arrangement of means for guiding an axle.
Figure 3:
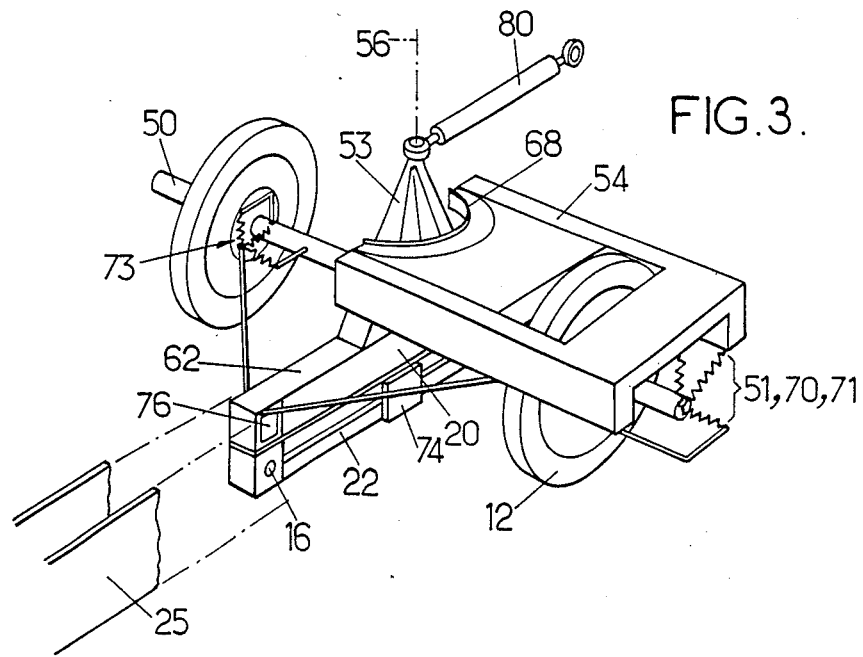

FIGS. 3 and 3a show schematically one possible construction of the beam, which can be used when the rail 25 has a U shaped cross section and forms the fixed armature of a linear propulsion and braking motor whose inductor is mounted in a non magnetic material box forming the beam. Beam 20 has end stops 76 and central stops 74. The central stops 74, very close to the rail during normal operation, project with respect to the rest of the beam leave the beam free to assume a small deviation angle, acting in the recentering direction. The end stops 76 protect the motor from shocks against the armature rail 25. These stops 76 may be formed by brake shoes for immobilizing in a station, even for emergency braking. In this latter case, the circuit shown in FIG. 2 must be completed by means making it possible, should the need arise, to position the axle "crabwise" by means of the electromagnets 22 and 24. The end sensor 16 and 18 may be above the end stops 76 and the median sensors 20 above the central stops 74. All sensors are advantageously of the contactless type.

Figure 4:
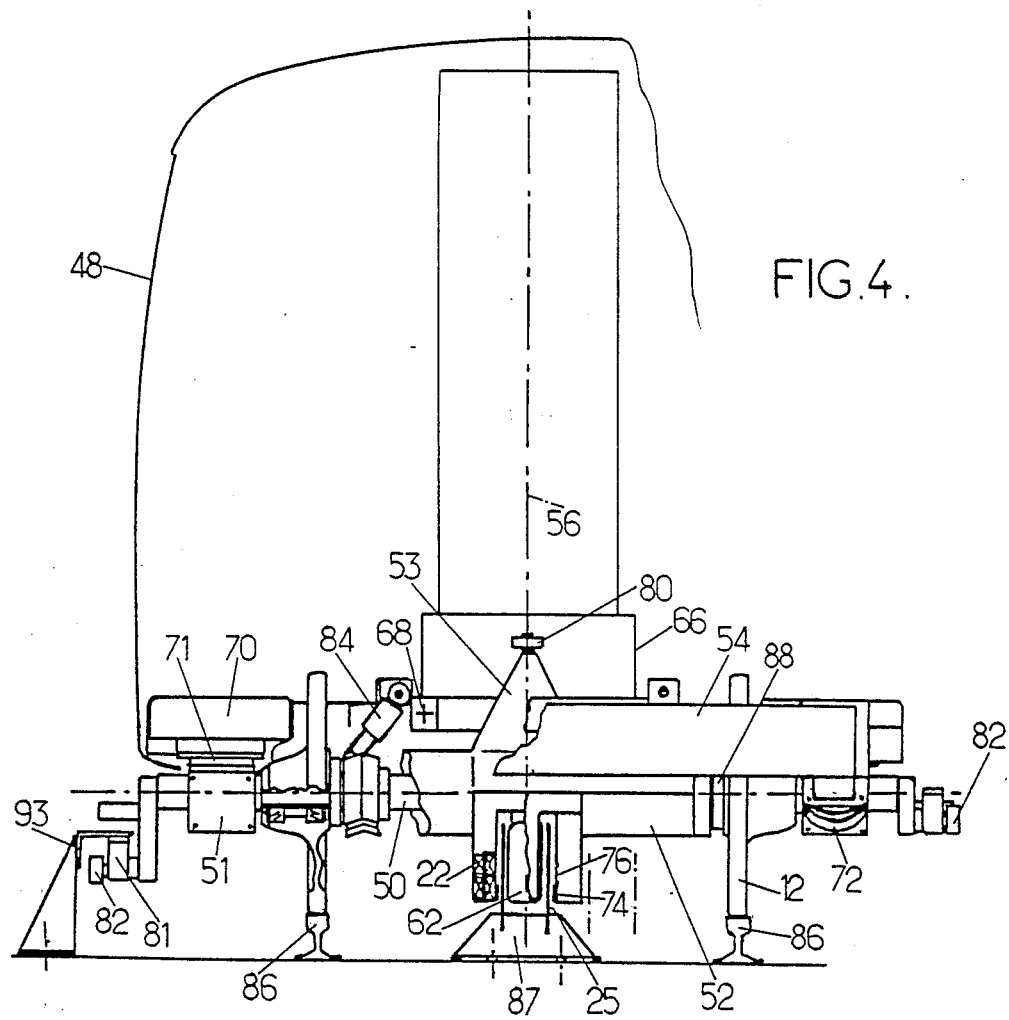
FIGS. 4, 5 and 6 show, respectively in a front view, in a side view (in partial section) and in a top view one embodiment of the means shown schematically in FIG. 3, with a U shaped beam.
Figure 5:
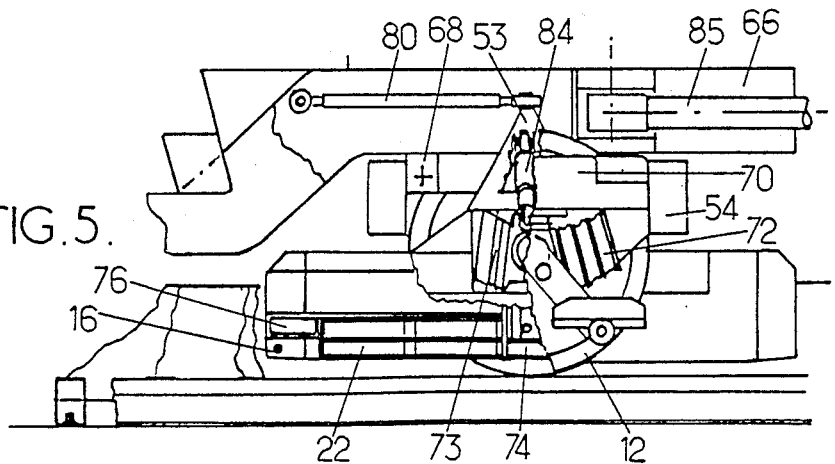
Figure 6:
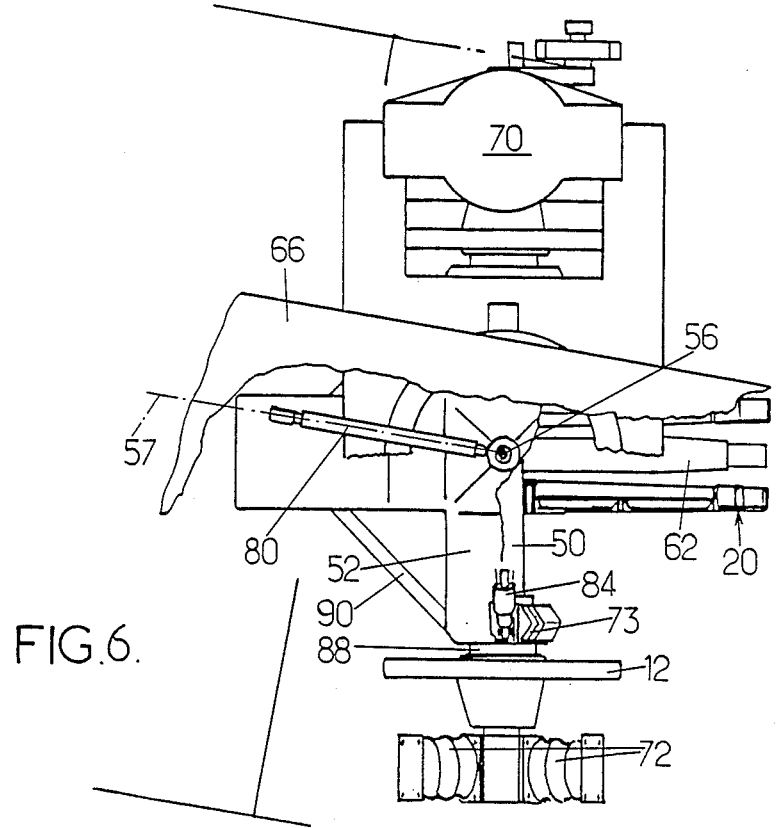

In FIGS. 4 to 6, referring to which the parts corresponding to those in FIG. 3 are designated by the same reference numbers, the body 48 has a single longitudinal member 66 containing a hitching bar 85 mounted for pivoting about a vertical axis and the shock node. The longitudinal member 66 rests on a load bearing cross member 54, via a ball ring 68 with vertical axis. The load bearing cross member 54 in its turn rests on an axle cross member 60 through a double suspension.

In the embodiment illustrated, the suspension has two pairs of flexible elastomer studs 72 and pneumatic cushions 70. These latter are not indispensable and may be frequently omitted. The elastomer studs 72 rest on a box 51 (FIG. 4) equipped with a primary suspension of high stiffness intended to come into play should the corresponding air cushion 70 come into abutment.

The elastomer studs 72, through their high longitudinal rigidity, absorbed the braking and tractive forces. Having low rigidity in the cross direction, they complete the action of the pneumatic cushion 70. FIG. 4 shows that it is possible to place the cushion 70 at the same level as the floor of body 48 and studs 72 at the same level as the axle shaft.

Two dampers 84, disposed in a V arrangement (so as to have great attachment stiffness) between the ball ring 58 (or the load bearing cross member, at a point situated in the immediate vicinity of the ball ring) and the axle cross member 50, in the immediate vicinity of wheels 12, brake the transverse movements of the body.

The wheels 12 are mounted independently through conical roller bearing boxes on the tubular axle cross member 50, corresponding to the axle shaft 10 in FIGS. 1 and 3. Wheels 12 may have a convex tread and bear on flat rails 86 (FIG. 4) since guiding is no longer provided by the taper of the rail treads. Since the wheels must pass through the armature rail 25 in certain types of switches, this rail must have gaps at these points. To reduce the length of the gaps and reduce the weight of the wheels and the inertia of the axle, the wheels 12 advantageously have a smaller thickness than conventional railroad vehicle wheels.

In the embodiment shown in FIGS. 4 to 6, the beam encloses the armature rail 25 instead of being inside it. It consequently has an inverted U shaped section carrying the electromagnets 22 and 24, sensors 16 and 18 (possibly the central sensor 20 also), stops 74 and 76 and the active part of the linear motor. This motor 62 may be supported mainly at the ends of the beam. The beam is enclosed in a hollow transverse girder 52 (FIGS. 4 and 6).

The hollow girder 52 rests on the axle cross member by a motor suspension which must be rigid in the transverse and longitudinal directions. This suspension has two pairs of elastomer chevrons 73 close to wheels 12. The suspension of the motor is thus independent of that of the body, which limits its free movement and the rolling of the beam. The suspension of the motor acts essentially in the vertical direction. It connects together rigidly against relative rotation beam 20, the electromagnets 22 and 24 and the axle and transmits the tractive and braking forces to the axle cross member 50. In the embodiment illustrated, the axle cross member 50 is at a level higher than the center of action of motor 62. A link 80 placed in the longitudinal member 66 is provided for absorbing the swivelling force. One of the ends of link 80 is hinged, in line with the vertical axis of rotation 56 of the axle, to a mast 53 embedded in the hollow girder 52 and beam 20. The other end of link 80 is hinged to the longitudinal member 66 at a point located along the axis 57 of the body (FIG. 6).

The electromagnets 22 and 24 confront the external faces of the rail forming an armature and guide member. These electromagnets 22 and 24 include a carcass fixed rigidly at the bottom of beam 20, and made from a non magnetic material. This beam may more particularly be made from stainless steel and manufactured by welding. The electromagnets 22 and 24 are placed symmetrically with respect to the central stop 74. The faces of the carcases are advantageously slightly chamfered so as to facilitate swivelling of the beam in the curves of the track.

The central stops 74 are advantageously formed of greased steel plates also having chamfered leading edges. These plates are advantageously mounted on a rigid elastomer plate so as to limit the strength of the shocks and avoid vibrations. They may be adjustable for taking up the wear thereof. To reduce the torque of the forces exerted by the steps 14 on the guide rail, stops 74 are placed advantageously in the low part, namely close to the embedment of rail 25.

The four end stops 76 may form brake shoes, as was mentioned above. They may also be carried by adjustable plates for taking up the wear or consist such plates.

The electric current for supplying the motor may be provided by the usual methods used in railway transport. In the case illustrated in FIGS. 4 and 5, the current is fed through a conducting rail 93. Each axle box 51 is provided with a pick up assembly able to take up a work position (shown on the left in FIG. 4) and a retracted position when passing over switches (on the right in FIG. 4). Each assembly has a shoe 81 and a roller 82 cooperating with cams of the track for retracting and extending shoe 81.

The axle may include other elements fulfilling additional functions. It may for example comprise a part 88 freely rotatable about the axle cross member for fixing a pneumatic or electromagnetic shoe holding brake for engaging wheel 12 under the load cross member 54. The cross member may then be connected to the shoe by a link for transmitting the braking force conventionally. To limit the transverse amount of movement of the suspension, stops (not shown) may be disposed between the ball ring and mast 53.

In the embodiment shown in FIG. 4, rail 25 is reduced to two parallel sides embedded in short cross members 87 disposed transversally to the track and spaced apart at regular intervals therealong. The sides may be made from steel, covered on the internal face with a thin layer of an electrically conducting material. Their thickness may vary and be smaller in curves for facilitating the passage of the motor. The cross members may on the contrary be made from a non-magnetic but electrically conducting material.

I claim:

1. Angularly movable axle for a railroad vehicle, comprising a shaft having an axis and angularly movable about a vertical direction, independent metal wheels rotatable on said shaft about said axis for rolling movement on a track including a central guide rail, a beam fast with said shaft and perpendicular to said axis, sensor means for measuring an actual angular position of the beam with respect to the track, means for determining a reference position of said beam with respect to the track, electromagnetic means operatively associated with the beam and cooperating with the track for exerting on the axle a force for angularly moving said axle, and a control circuit receiving input signals from said sensor means and arranged for delivering electric currents to the electromagnetic means of such value that said electromagnetic means exert a force on said beam which results in angular movement of the axle in a direction which results in generation of a return force which tends to cancel out the difference between the actual position of the beam and the reference position responsive to movement along the track, wherein the central guide rail has a U shaped section and the beam comprises a girder travelling inside the rail and containing the active part of a linear traction motor and a carrier frame situated on each side of the rail and carrying the sensors and the electromagnetic means cooperating with the rail.

2. Angularly movable axle for a railroad vehicle, comprising a shaft having an axis and angularly movable about a vertical direction, independent metal wheels rotatable on said shaft about said axis for rolling movement on a track including a rail, a beam fast with said shaft and perpendicular to said axis, sensor means for measuring an actual position of the beam with respect to the track, means for determining a reference position of said beam with respect to the track, electromagnetic means operatively associated with the beam and cooperating with the track for exerting on the axle a force for angularly moving said axle, and a control circuit receiving input signals from said sensor means and arranged for delivering electric currents to the electromagnetic means of such value that said electromagnetic means exert a force on said beam which results in angular movement of the axle in a direction which results in generation of a return force which tends to cancel out the difference between the actual position of the beam and the reference position responsive to movement along the track, wherein the beam includes mechanical stops limiting the angular deflections of the beam with respect to the track, some of the stops being placed in the center of the beam and having a projection such that, when they come into contact with the rail, they allow a deflection angle of the axle tending to recenter this latter.

3. Angularly movable axle for a railroad vehicle, comprising a shaft having an axis and angularly movable about a vertical direction, independent metal wheels rotatable on said shaft about said axis for rolling movement on a track, a beam fast with said shaft and perpendicular to said axis, sensor means for measuring an actual position of the beam with respect to the track, means for determining a reference position of said beam with respect to the track, electromagnetic means operatively associated with the beam and cooperating with the track for exerting on the axle a force for angularly moving said axle, and a control circuit receiving input signals from said sensor means and arranged for delivering electric currents to the electromagnetic means of such value that said electromagnetic means exert a force on said beam which results in angular movement of the axle in a direction which results in generation of a return force which tends to cancel out the difference between the actual position of the beam and the reference position responsive to movement along the track, wherein the electromagnetic means include two sets of electromagnets, each set being placed in the vicinity of a respective one of the ends of the beam and arranged to exert a torque for angularly moving the beam and the shaft and further include an additional set of electromagnets placed in the middle of the beam and fed with power so as to exert a transverse force should a predetermined deviation value be exceeded.

4. Axle according to claim 2, wherein the stops further include end stops forming braking shoes and in that the control circuit is controllable so as to cause these end stops to come into contact with the rail.

5. Angularly movable axle for a railroad vehicle, comprising a shaft having an axis and angularly movable about a vertical direction, independent metal wheels rotatable on said shaft about said axis for rolling movement on a track, a beam fast with said shaft and perpendicular to said axis, sensor means for measuring an actual position of the beam with respect to the track, means for determining a reference position of said beam with respect to the track, electromagnetic means operatively associated with the beam and cooperating with the track for exerting on the axle a force for angularly moving said axle, a control circuit receiving input signals from said sensor means and arranged for delivering electric currents to the electromagnetic means of such value that said electro-magnetic means exert a force on said beam which results in angular movement of the axle in a direction which results in generation of a return force which tends to cancel out the difference between the actual position f the beam and the reference position responsive to movement along the track and mechanical stop means on said beam limiting angular deflection of the beam with respect to the track, said stop means including stops located in a center portion of the beam and projecting by such an amount that, when they come into contact with a central rail belonging to the track, they allow a deflection angle of the axle tending to recenter the latter upon movement of the vehicle.

6. Axle according to claim 5, wherein the stop means further include end stops forming braking shoes and wherein the control circuit is controllable so as to cause these end stops to come into contact with the guide rail.

* * * * *